(12) United States Patent
Ohtsuka

(10) Patent No.: US 7,725,623 B2
(45) Date of Patent: May 25, 2010

(54) COMMAND TRANSFER CONTROLLING APPARATUS AND COMMAND TRANSFER CONTROLLING METHOD

(75) Inventor: Katsushi Ohtsuka, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/628,684

(22) PCT Filed: May 10, 2006

(86) PCT No.: PCT/JP2006/309768

§ 371 (c)(1),
(2), (4) Date: Mar. 6, 2007

(87) PCT Pub. No.: WO2006/134746

PCT Pub. Date: Dec. 21, 2006

(65) Prior Publication Data

US 2008/0307115 A1    Dec. 11, 2008

(30) Foreign Application Priority Data

Jun. 14, 2005    (JP)    ............... 2005-174209

(51) Int. Cl.
G06F 3/00    (2006.01)
(52) U.S. Cl. ............ 710/38; 710/5; 710/6; 710/39
(58) Field of Classification Search ............ None
See application file for complete search history.

(56) References Cited

U.S. PATENT DOCUMENTS

| 5,212,795 | A | * | 5/1993 | Hendry | .............. | 710/28 |
| 5,752,010 | A |   | 5/1998 | Herbert |  |  |
| 6,205,504 | B1 | * | 3/2001 | Faust et al. | .............. | 710/305 |
| 6,985,970 | B2 |   | 1/2006 | Graham et al. |  |  |
| 2003/0149829 | A1 | * | 8/2003 | Basham et al. | .............. | 711/4 |

(Continued)

FOREIGN PATENT DOCUMENTS

JP    10301885    11/1998

(Continued)

OTHER PUBLICATIONS

Newton, Harry, Newton's Telecom Dictionary, 2002, CMP Books, 18th Edition, p. 682.*

(Continued)

*Primary Examiner*—Eron J Sorrell
(74) *Attorney, Agent, or Firm*—Matthew B. Dernier, Esq.; Gibson & Dernier LLP

(57) ABSTRACT

Commands received from an apparatus that does not support virtual channels are assigned to a virtual channel. A command receiver 210 receives, from an external command transmitting entity that does not support virtual channels, a command designating an address. An assignment information storage unit 228 stores an assignment table in which an address space is divided into a plurality of areas and a channel is assigned to each area. A command storage unit 230 contains queues provided for respective channels, wherein each queue stores received commands temporarily. A distribution destination specifying unit 224 specifies a queue corresponding to an address by referring to the assignment table, and an execution unit 222 transfers the received command to the command storage unit 230 that corresponds to the specified queue.

11 Claims, 3 Drawing Sheets

U.S. PATENT DOCUMENTS

2004/0215849 A1   10/2004   Graham

FOREIGN PATENT DOCUMENTS

| JP | 11085681 | 3/1999 |
| JP | 2001056793 | 2/2001 |
| JP | 2003-067318 | 3/2003 |
| JP | 2003067318 A | 3/2003 |
| JP | 2003099384 | 4/2003 |
| JP | 2004326782 A | 11/2004 |
| JP | 2004046392 | 12/2004 |
| JP | 2005-010956 | 1/2005 |
| JP | 2005010956 A | 1/2005 |
| WO | 9934294 A | 7/1999 |

OTHER PUBLICATIONS

ISR and Written Opinion, Aug. 22, 2006.

International Preliminary Report and Written Opinion for PCT/JP2006/309768.

Office Action for corresponding Korean Patent Application 10-2007-7000924.

Office Action for corresponding Chinese Patent Application 200680001023.8 dated Apr. 18, 2008.

Office Action for corresponding European Patent Application 06732619.9 dated Aug. 21, 2008.

Office Action for corresponding Japanese Patent Application 2005174209 dated Sep. 1, 2009.

Rejection Decision for corresponding Chinese Application 2006800010238 dated Sep. 25, 2009.

Office Action for corresponding Japanese Patent Application 2005-174209 dated Mar. 3, 2009.

* cited by examiner

COMMAND TRANSFER CONTROLLING APPARATUS AND COMMAND TRANSFER CONTROLLING METHOD

TECHNICAL FIELD

This invention relates to technologies by which command transfers may be controlled, and it particularly relates to a technology by which to control the transfer order of commands received from an external source.

BACKGROUND TECHNOLOGY

Along with marked advances in recent years of computer graphics technology and image processing technology, which are used in the areas of computer games, digital broadcasting and the like, there is a demand for information processing apparatuses, such as computers, game machines and televisions, to have the capacity to process image data of higher definition at higher speed. To meet such demand, it goes without saying that it is necessary to realize high speed of arithmetic processing, but it is just as important to appropriately distribute the tasks among a plurality of processing units.

In so doing, control commands (hereinafter simply referred to as "commands") for instructing the execution of tasks to one another are sent and received among a plurality of processing units, and thus the processing units operate in linkage with one another. For example, a processing unit A transmits a variety of commands to another processing unit B. The processing unit B queues the received commands in its own queue. The processing unit B executes the commands in the queue in the order of ones easier to execute. This type of processing, namely, command queuing and out-of-order execution, is widely employed as an effective technique in having the processing unit A and the processing unit B operate asynchronously and raising the processing efficiency of a plurality of processing units as a whole.

The commands queued in the processing unit B are transferred to any one of a plurality of command execution entities. Here, the command execution entities may be hardware-like modules, such as various types of arithmetic units built inside the processing unit B or software-based modules, such as processes executed by the processing unit B.

The commands transmitted from the processing, unit A are transferred to the processing B and then to the command execution entities for said commands, so that the tasks are distributed to various types of calculation resources as a whole.

The processing unit B may have a plurality of queues for each command execution entity. When the processing unit A transmits commands to the processing unit B, it may transmit also the ID information for explicitly identifying the command execution entities. In such a case, the processing unit B inputs a received command to the queue of the command execution entity according to the ID information. Then a command is issued, as needed, from each queue to the corresponding command execution entity.

Providing the queue independently for each command execution entity facilitates the smooth issuance of commands to each command execution entity controlled by the processing unit B. For example, even when a command execution entity α is in a busy state and many commands accumulate in a corresponding queue, the queue for a command execution entity β is not directly affected therefrom. This makes it less likely that the command issuance timing to the command execution entity β is delayed excessively according to command execution entity α.

However when the processing unit B receives commands from a processing unit C, which originally does not have such a function of transmitting the ID information as above, it is more general that the processing unit B inputs commands to a particular queue. Hence, when the processing unit B receives commands from the processing unit C, the commands are likely to be accumulated in the particular queue. That is, even if the processing unit B has a plurality of queues, such a merit will not be enjoyed at the time of responding to the processing unit C. In this manner, to effectively take advantage of the function of processing unit B it is prerequisite that the ID information for identifying the command execution entities from the command transmitting entities be transmitted.

SUMMARY OF THE INVENTION

The present invention has been made to address the foregoing problems and a main objective thereof is to provide a technology for efficiently controlling the commands that are transmitted and received among a plurality of processing units.

An embodiment according to the present invention relates to a command transfer controlling apparatus.

This apparatus comprises: a command receiver which receives from an external command transmitting entity a command that has specified an address; a channel assignment unit which assigns a channel to be transferred to a command, according to the address of the received command; a command storage unit which stores the received commands temporarily; and a command transfer unit which transfers a command to which a predetermined channel is assigned, to a command execution entity in preference to commands assigned to the other channels among the commands stored.

The term "channel" here may also be a virtual line realized on a physical line. Each command may be allocated to any one of a plurality of channels and then transferred on the physical line. A command transfer unit may also select a channel through which a command is to be issued, in a manner such that a command is issued at a predetermined rate among a plurality of channels. This apparatus may further comprise an assignment change unit which changes the allocation rate of channels according to the number of commands stored. A channel assignment unit may also assign channels so that a plurality of commands stored are distributed to a plurality of channels at a predetermined rate. If the number of commands in which any one of a plurality of channels is assigned is greater than or equal to a predetermined number, the assignment change unit may change the allocation rate so that a channel other than said channel is likely to be assigned. This can realize a process that prevents the case where a particular channel is assigned too frequently and excessively.

Another embodiment according to the present invention relates also to a command transfer controlling apparatus.

This apparatus is characterized in that a command, received from a command transmitting entity, which does not uniquely specify a command execution entity is temporarily stored and an order in which a plurality of received commands are transferred is changed according to an address specified by the command.

It is to be noted that those expressing the present invention by a method, an apparatus, a system, a recording medium, a computer program are also effective as the present embodiments.

DETAILED DESCRIPTION OF THE INVENTION

Figure 1:
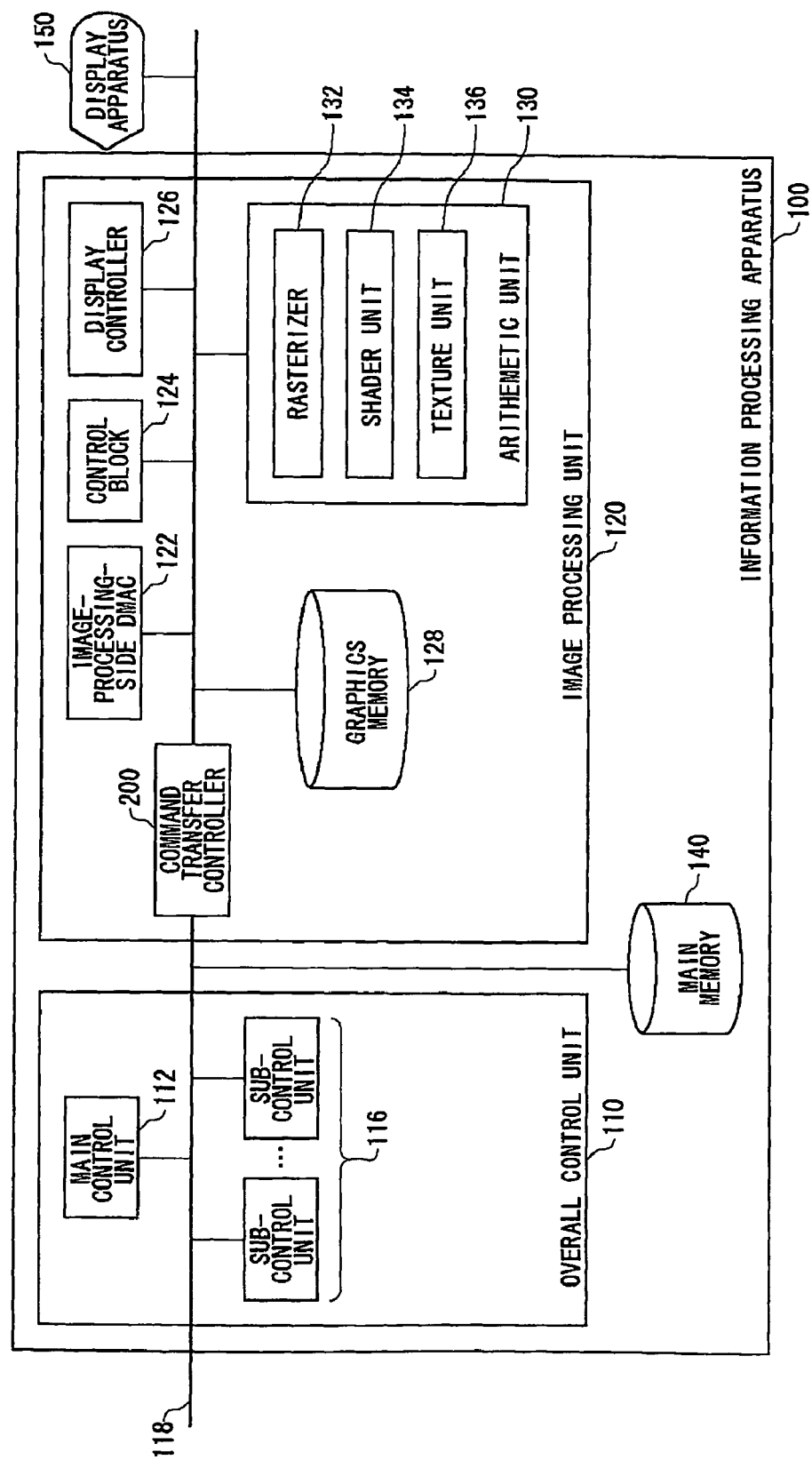
FIG. 1 is a function block diagram of an information processing apparatus.

FIG. 1 is a function block diagram of an information processing apparatus.

An information processing apparatus 100 includes an overall control unit 110, an image processing unit 120 and a main memory 140. The information processing apparatus 100 is connected to a display apparatus 150. The display apparatus 150 outputs the image or video that has been obtained as a result of processing by the overall control unit 110 and the image processing unit 120. The information processing apparatus 100 is also connected via a bus 118 to one or more I/O devices (not shown), such that the information processing apparatus 100 may control such external devices. The I/O devices may be of any number and any of a plurality of types. The overall control unit 110 and the image processing unit 120 are each formed as a single-chip electronic device and are physically separated from each other. The information processing apparatus 100 is formed as an electronic device that further contains these electronic devices.

In terms of hardware, each element described, as a function block for carrying out a variety of processing tasks, as shown in FIG. 1 and the like, can be realized by a CPU (Central Processing Unit), a memory and other LSI (Large Scale Integration). In terms of software, it is realized by memory-loaded programs or the like that have a function of reserved management. Thus, it is understood by those skilled in the art that these function blocks can be realized in a variety of forms such as by hardware only, software only or the combination thereof and are not limited to any of these in particular.

Executed in the information processing apparatus 100 is an operating system (hereinafter referred to simply as "OS (Operation System)") for providing functions and an environment for efficient use of the information processing apparatus 100 and controlling the whole apparatus in a unified manner. A plurality of application software programs may be executed on the OS.

The overall control unit 110 includes a main control unit 112 and a plurality of sub-control units 116. The sub-control units 116 and the main control unit 112 can communicate with each other via the bus 118. The main control unit 112 assigns tasks (the basic processing unit of each application), to the respective sub-control units 116. Alternatively or additionally, the main control unit 112 may execute the tasks itself. With the sub-control units 116 executing their respectively assigned tasks, a plurality of tasks are processed in parallel with one another.

Hereinbelow, the processes executed by the main control unit 112, including the task assignment processing, are called the "main process", and the processes executed by the sub-control units 116 the "sub-process". The main control unit 112 executes processes for overall control of the information processing apparatus 100, such as a user-interface-related processing which has a relatively high priority. In contrast to this, the sub-control units 116 execute processes subcontracted from the main process, such as calculations executed in the background which has a relatively low priority.

A DMAC (Direct Memory Access Controller), not shown, included in the main control unit 112 or the sub-control units 116 controls data transfer, data save and the like with a built-in graphics memory 128 in the main memory 140 or the image processing unit 120 by a command from the main control unit 112 or the sub-control unit 116.

The main memory 140 is a storage area used mainly by the overall control unit 110. In the main memory 140, data related to the execution status of a task are stored. For example, coordinate data obtained as a result of coordinate calculation concerning computer graphics executed by the overall control unit 110 are stored temporarily. There are also cases where data generated by the image processing unit 120 are saved in this main memory 140.

The image processing unit 120 is a unit that exclusively executes image processing, for instance, rendering processing. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute a plurality of image processes in parallel.

The image processing unit 120 includes a graphics memory 128, an arithmetic unit 130, a display controller 126, a control block 124, an image-processing-side DMAC 122 and a command execution controller 200. These units are connected with one another via the bus 118 and thus the units can communicate with one another.

The graphics memory 128 is a memory area for storing graphics data that are used and managed by the image processing unit 120. Provided in the graphics memory 128 are not only a frame buffer and a Z-buffer, where image frame data are stored, but also areas corresponding to data, such as vertex data, texture data, and a color lookup table, which are the basic data referred to at the rendering of image frame data.

The control block 124 is a block for controlling the image processing unit 120 as a whole. The control block 124 performs an overall control of the arithmetic unit 130, the graphics memory 128 and the display controller 126 and carries out synchronization management, timer management and the like of data transfer between the respective blocks.

The image-processing-side DMAC 122 controls the data transfer, data save and the like between the overall control unit 110 or the main memory 140 and the graphics memory 128, following a command from the control block 124.

The display controller 126 generates horizontal and vertical synchronization signals and loads, sequentially in a line, the pixel data of image frame data from a frame buffer stored in the graphics memory 128 according to the display timing of the display apparatus 150. Furthermore, the display controller 126 makes an output by converting the pixel data having been loaded in a line, from the digital data comprised of RGB (Red-Green-Blue) color values, into a format corresponding to the display apparatus 150.

The arithmetic unit 130 carries out a variety of arithmetic processes concerning graphics, following the commands from the control block 124. One example of such processing may be a series of rendering processes of generating image frame data through coordinate transformation, hidden-surface elimination and shading based on three-dimensional modeling data and writing them into a frame buffer.

The arithmetic unit 130 includes such function blocks as a rasterizer 132, a shader unit 134 and a texture unit 136 in order to effect a high-speed processing of three-dimensional graphics in particular.

The rasterizer 132 receives vertex data of a basic object to be rendered (hereinafter referred to as "primitive") from the overall control unit 110 and performs a view transformation of converting the primitive on a three-dimensional space into graphics on a rendering plane through a projection transformation. Furthermore, it carries out a raster processing of scanning the graphics on the rendering plane along the horizontal direction of the rendering plane and converting them column by column into quantized pixels. The primitive is pixel-expanded by the rasterizer 132, and the pixel information is calculated for each pixel. The pixel information includes RGB color values, $\alpha$ values indicating transparency, and Z values indicating depth from viewpoints.

The rasterizer 132 generates a pixel area of a predetermined size along the scan lines and outputs it to the shader unit 134 and the texture unit 136. The pixel areas outputted from the rasterizer 132 are once stacked into a queue, and the shader unit 134 processes the stacked pixel areas one by one.

The shader unit 134 carries out shading processing based on the pixel information calculated by the rasterizer 132, determines the pixel colors after a texture mapping based on the texture information obtained by the texture unit 136, and writes the image frame data after the shading processing in a frame buffer in the graphics memory 128. Furthermore, the shader unit 134 performs processes, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs them to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. The data generated by the image processing unit 120 are transferred to the graphics memory 128 and the main memory 140.

The command execution controller 200 included in the image processing unit 120 issues a command transmitted from the overall control unit 110 to the image processing unit 120, to each unit in the image processing unit 120. A command transfer controller 200 receives commands transmitted from not only the main control unit 112 or sub-control unit 116 in the overall control unit 100 but also other devices such as an I/O device. That is, the command transfer controller 200 collectively receives the commands transmitted from external command transmitting entities to the image processing unit 120, and issues the received commands to various units, which are command execution entities, such as the control block 124 and display controller 126. Each unit included in the image processing unit 120 executes various tasks specified by a command issued from the command transfer controller 200. Each of such units is formed as a single-chip electronic device contained in the image processing unit 120. In the present embodiment, the "command" may be one that directly defines the control contents which are carried out by a command execution entity or one that instructs a data transfer, or may be a parameter used for the control by a command execution entity. A command is turned into packets on the bus 118 and then transferred.

The detail of a command transfer controller 200 will be described in conjunction with FIG. 3.

Figure 2:
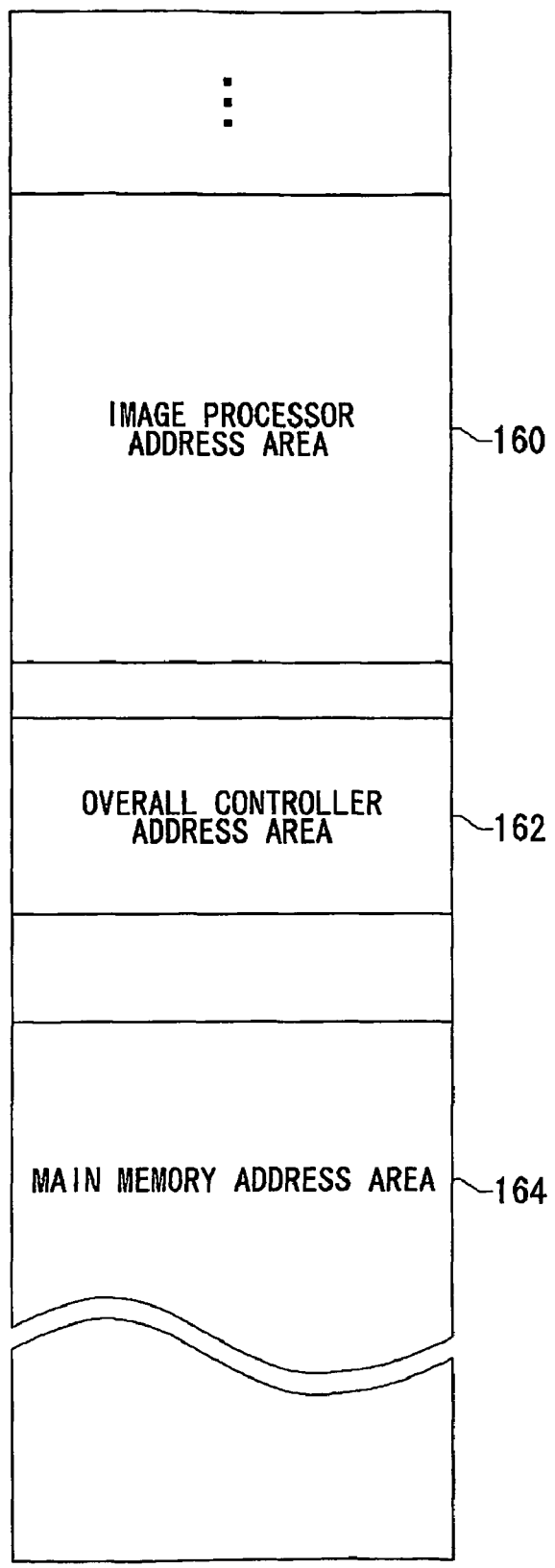
FIG. 2 is a schematic diagram illustrating a concept of address space viewed from an overall control unit.

FIG. 2 is a schematic diagram illustrating a concept of address space viewed from an overall control unit.

The storage area of the information processing apparatus 100 is integrally structured by cache memories built inside the main control unit 112 and the sub-control unit 116 in addition to the main memory 140 and the graphics memory 128 as well as memories built inside the other I/O devices. The processes executed on the overall control unit 110 can access these physical memories via the virtual addresses. The same figure illustrates schematically a virtual address space in terms of processes executed in the overall control unit 110.

An image processor address area 160 shown in the same figure is an address rage which is allocated to control the image processing unit 120 in terms of the above processes executed by the overall control unit 110. An overall controller address area 162 is an address range which is allocated to control the overall control unit 110. A main address area 164 is an address which is allocated to control the main memory 140.

In the above processes executed by the overall control unit 110, the various types of commands are transferred to the image processing unit 120 after the addresses to which the processing results of commands are written have been specified. At this time, the addresses are translated to physical addresses by an MMU (Memory Management Unit), not shown, which is built inside the overall control unit 110. Thus, the physical addresses are assigned to the commands that the image processing unit 120 receives from the overall control unit 110. This assigned physical address may correspond to the graphics memory 128 or maim memory or may correspond to various local memories built inside the overall control unit 110.

Figure 3:
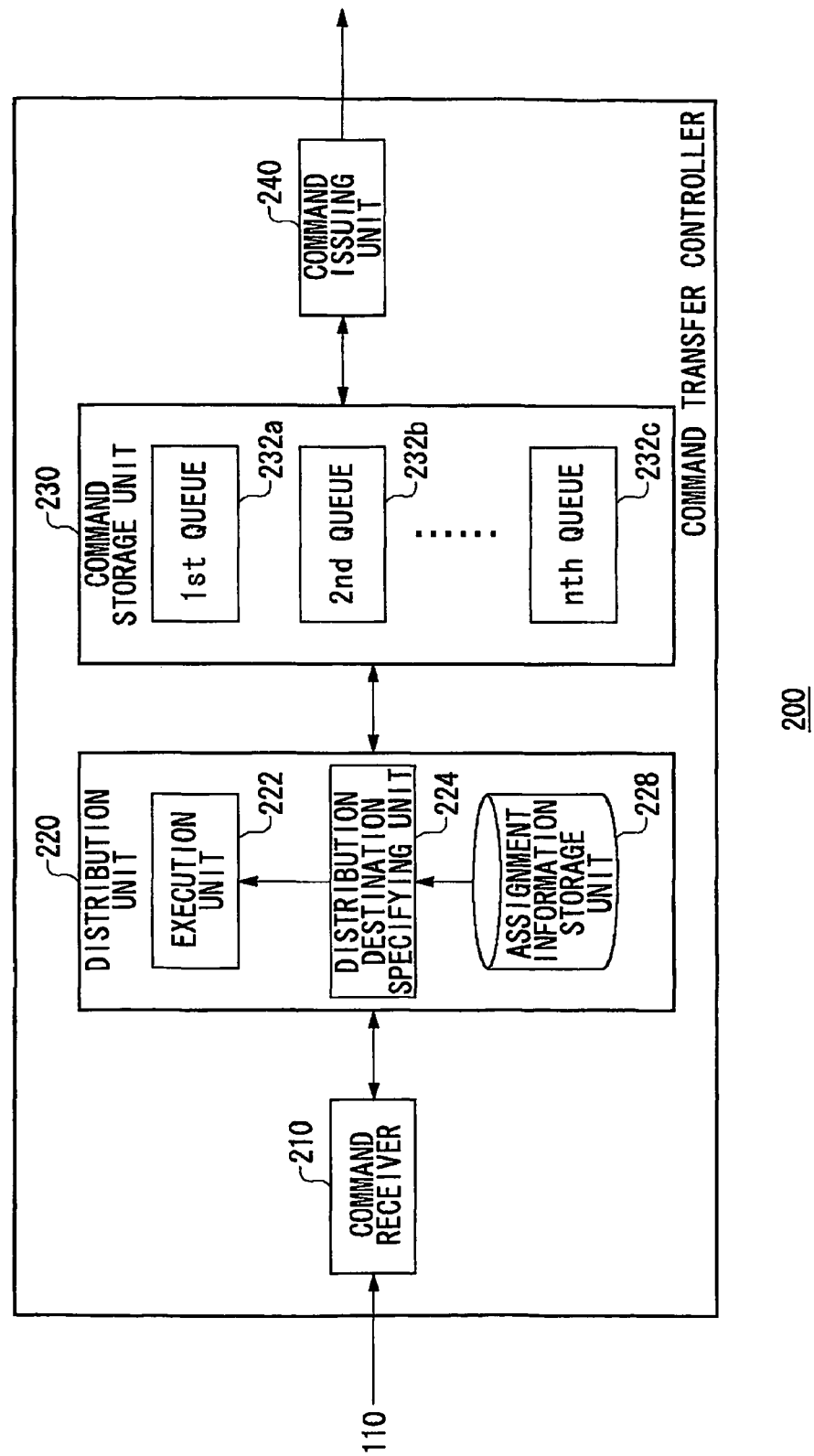
FIG. 3 is a function block diagram of a command transfer controller.

FIG. 3 is a function block diagram showing functions of a command transfer controller.

The command transfer controller 200 includes a command receiver 210, a distribution unit 220, a command storage unit 230 and a command issuing unit 240.

The command receiver 210 receives various types of commands from the command transmitting entities such as the overall control unit 110. The distribution unit 220 specifies channels through which the received commands are transferred to the command execution entities. Although the bus 118 is a single physical line, the bus 118 can be realized as a plurality of virtual lines in the single physical line if a command is transferred in a manner such that the command is divided into a plurality of streams. The distribution unit 220 classifies the received commands into a plurality of kinds. In other words, each command is allocated to any one of a plurality of channels, which are virtual lines, where transfer attributes of plural kinds are defined. Then, the commands are transferred to the respective command execution entities by using methods suitable for the transfer attributes of the applicable channels.

The command storage unit 230 stores the commands separately for each of the allocated channels. The command issuing unit 240 issues a command stored in the command storage unit 230 to a command execution entity through an applicable channel.

The distribution unit 220 includes an execution unit 222, a distribution destination specifying unit 224 and an assignment information storage unit 228.

The range of a physical address assigned for commands is divided into a plurality of areas. The assignment information storage unit 228 stores assignment information that indicates how these respective areas have been defined, as table data (hereinafter referred to as "assignment table"). Each area may be specified by a start address and an end address in a manner, for example, that a first area corresponds to the addresses of "0x00000 to 0x05000" and a second area the addresses of "0x05001 to 0x18000". Each area corresponds directly to any one of the channels. The command storage unit 230 is provided with a plurality of queues according to these respective channels. For example, the assignment is such that a first queue 232a corresponds to the channel 1 and first area, a second queue 232b the channel 2 and second area, . . . and an nth queue 232c the channel n and nth area. In this manner, the queue is in correspondence to the area and channel.

The distribution destination specifying unit 224 specifies an area of the physical address, to which the write destination, specified by the command received by the command receiver 210, belongs and therefore specifies the channel to which it is to be allocated. In response to this allocated channel, the execution unit 222 transfers the command to any one of the queues in the command storage unit 230. In this manner, the commands are distributed to the respective queues in the command storage unit 230.

The command issuing unit 240 selects any one of the queues in the command storage unit 230, takes out the command in said queue and transfers it to a command execution entity through a corresponding channel.

Here, an explanation is further given of the channels that correspond to various transfer attributes.

For example, suppose that three channels, channel A, channel B and channel C, are defined. Suppose that low latency and low jitter are required of the channel A and that the channel A is a channel for a video data transfer where the variation in the transfer amount is small. The channel B is a channel used to transfer the vertex data or texture data which have a larger amount and a larger variation in the transfer amount than the channel A. The channel C is a channel used to transfer graphics processing control commands which have a smaller transfer amount but requires a management of transfer order.

Here, assume that the priority level of command transfer is set in the order of channels A, B and C. Suppose that a transfer rate of channels A, B and C is set to 2:5:3. As one example, the command issuing unit 240 first takes out one command from the queue corresponding to the channel A and transfers it to a command execution entity. When two commands are transferred by the channel A, commands are transferred next from a queue corresponding to the channel B. After five commands have been transferred by the channel B, commands are transferred next from a queue corresponding to the channel C. After three commands have been transferred by the channel C, commands are again taken out from the queue corresponding to the channel A. In this manner, the command issuing unit 240 has each channel transfer the commands, based on the transfer priority level and transfer rate between each channel.

Also, the management of transfer order as in the channel C is carried out. That is, as a method for controlling the transfer about a channel where in-order processing is performed, there are two such methods as follows.

1. When commands are transferred to the channel C, the transfer of the commands by the channel C continues until the commands are exhausted in the queue corresponding to channel C. That is, when the channel C is selected, the channel A and channel B are not selected as a channel, through which the commands are to be transferred, until the commands are depleted in the queue corresponding to the channel C.
2. The order in which an external command transmitting entity has issued commands through the channels A and B do not necessarily coincide with the order in which these commands are actually transferred to the command execution entities. In contrast thereto, in the case of channel C the control is such that it is guaranteed that the order in which the commands have issued coincides with the order in which they are transferred. In this case, differing from 1, the command transfer about the channels A and B will not be blocked on account of the command transfer about the channel C.

In this manner, various types of transfer attributes such as whether the in-order transfer is to be guaranteed or not are set for each channel. The ability to achieve a transfer order control using a wide variety of transfer attributes as discussed above, a similar control can be realized to that in which a plurality of lines differing in characteristics on the bus 118 are realized.

Conventionally, when a command transmitting entity does not have a function of transmitting ID information to specify a command execution entity as in the overall control unit 110, commonly practiced is a method in which the distribution unit 220 fixedly transfers commands to a particular queue (hereinafter referred to as "main queue") even if the command storage unit 230 has a plurality of queues. Thus, in such a case, the commands are naturally likely to accumulate intensively in the main queue. In other words, there is a drawback in that such a conventional-type command transfer controller 200 cannot achieve a primary function unless the command transmitting entity is provided with a function of specifying a command execution entity.

As a more specific example, after a command instructing to continuously transfer the image data has been transmitted from the overall control unit 110 to the graphics memory 128, a command by which to change the setting of any of units in the image processing unit 120 has been transmitted. Then the setting change command is held anew in the main queue in a state where image transfer commands are accumulated. Accordingly, even if the setting change command is a command in which the real-timeliness is required in the execution thereof, an adverse effect is caused in which the execution is impaired owing to the large amount of image transfer commands.

In contrast to this, the command transfer controller 200 according to the present embodiment distributes the commands among a plurality of queues according to a physical address assigned by a command. Hence, a plurality of queues provided in the command storage unit 230 can be made effective use of even if the command transmitting entity does not explicitly specify command execution entities.

According to the command transfer controller 200 described in the present embodiment, a single bus 118 can be utilized as if it were a plurality of virtual lines. It is frequently a case that characteristics of a command, such as whether it is an image data transfer command or setting change command, can be specified to some extent by a write destination address assigned by the command. Based on this knowledge, the command transfer controller 200 specifies a channel used for a command transfer, according to a physical address assigned by a command. Thus, the command transfer controller 200 can transfer commands using a plurality of channels without taking the trouble of particularly providing a new function in a command transmitting entity side.

It is not necessary for the distribution destination specifying unit 224 to specify areas by referring to all of the addresses assigned by the commands. The area may be specified based on part of an address, for example, high-order bits. For example, when an address is specified using the size of 64 bits, the lower 42 bits only may be used for the mapping in the real device whereas the remaining higher 12 bits only may be taken out and then used in the distribution destination specifying unit 224. In this manner, the assignment table may determine the correspondence of the areas according to high-order bits. If the bit size of an address to be handled is large, this method will be effective to reduce the processing load of the distribution destination specifying unit 224.

The distribution destination specifying unit 224 does not necessarily allocate channels fixedly according to the address of write destination. For example, the range of address allocated to the first queue 232a and the second queue 232b may be changed dynamically so that the rate of the number of commands stored in the first queue 232a to that stored in the second queue 232b in the command storage unit 230 does not become greater than or equal to 5:1. In this manner, a control may be done so that commands do not unduly accumulate in a particular queue.

Although in the present embodiments the command execution entities have been described as independent units in terms of hardware, they may be, for example, task in terms of software such as processes or threads executed in the image processing unit 120.

The present invention has been described based on the embodiments. These embodiments are merely exemplary, and it is understood by those skilled in the art that various modifications to the combination of each component and process thereof are possible and that such modifications are also within the scope of the present invention.

It is to be noted that the main feature of a channel assignment unit claimed and described herein may be achieved mainly by the distribution unit 220 in the present embodiments. A feature of a command storage unit claimed and described herein may be achieved by the command storage unit 230 in the present embodiments. However, it can be said that its main feature may be achieved by each queue included in the command storage unit 230. It can be said that a command transfer unit claimed and described herein may be achieved by the command issuing unit 240 in the present embodiments. It is also understood by those skilled in the art that the function to be achieved by each constituent element claimed and described herein may be realized by a single unit of each function block indicated in the present embodiments or in linkage with those.

The invention claimed is:

1. A command transfer controlling apparatus, comprising:
   a command receiver operable to receive a command having a specified address indicating a destination of writing a result of executing the command, from an external command transmitting entity which does not uniquely specify a command execution entity;
   a channel assignment unit operable to assign, to the command, a channel for transfer assigned to the address specified by the received command and indicating the destination, by referring to an assignment table in which an address range is divided into a plurality of areas and a channel is assigned to each area;
   a command storage unit operable to temporarily store the received commands in a queue, of a plurality of queues, corresponding to the channel assigned to the command; and
   a command transfer unit operable to transfer, of the commands respectively stored in the plurality of queues, a command, to which a predetermined channel is assigned, to a command execution unit, in preference to commands assigned to other channels.

2. A command transfer controlling apparatus according to claim 1, wherein said channel assignment unit is operable to specify a channel to be assigned, according to a predetermined part of the address specified by the received command and indicating the destination of writing the result of executing the command.

3. A command transfer controlling apparatus according to claim 1, wherein said command transfer unit is operable to select a channel to which a command is to be issued in a manner that commands are issued at a predetermined rate among a plurality of such channels.

4. A command transfer controlling apparatus according to claim 1, wherein the command execution entity is formed as a single-chip electronic device.

5. A command transfer controlling apparatus according to claim 1, wherein said command transfer controlling apparatus and the command execution entity are formed integrally as a single-chip electronic device.

6. A command transfer controlling apparatus according to claim 1, wherein said apparatus is formed as an electronic device physically separated from the command transmitting entity.

7. A command transfer controlling apparatus according to claim 1, wherein the channel assignment unit is operable to dynamically change the address range which indicates the destination of writing the result of executing the command and which should be assigned to each of a plurality of channels, such that the rate of the number of commands stored in a given queue, of a plurality of queues, to that stored in another queue is lower than a predetermined rate.

8. A command transfer controlling method, comprising:
   receiving, from an external command transmitting entity which does not uniquely specify a command execution entity, a command having a specified address indicating a destination of writing a result of executing the command;
   assigning, to the command, a channel for transfer assigned to the address specified by the received command and indicating the destination, by referring to an assignment table in which an address range is divided into a plurality of areas and a channel is assigned to each area;
   storing the received commands temporarily in a queue, of a plurality of queues, corresponding to the channel assigned to the command; and
   transferring, of the commands respectively stored in the plurality of queues, a command, to which a predetermined channel is assigned, to a command execution unit, in preference to commands assigned to other channels.

9. A command transfer controlling method according to claim 8, wherein the step of assigning dynamically changes the address range which indicates the destination of writing the result of executing the command and which should be assigned to each of a plurality of channels, such that the rate of the number of commands stored in a given queue, of a plurality of queues, to that stored in another queue is lower than a predetermined rate.

10. A storage medium containing a command transfer controlling program executable by a computer, the program causing the computer to perform functions, including the functions of:
    receiving, from an external command transmitting entity which does not uniquely specify a command execution entity, a command having a specified address indicating a destination of writing a result of executing the command;
    assigning, to the command, a channel for transfer assigned to the address specified by the received command and indicating the destination, by referring to an assignment table in which an address range is divided into a plurality of areas and a channel is assigned to each area;
    storing the received commands temporarily in a queue, of a plurality of queues, corresponding to the channel assigned to the command; and transferring, of the commands respectively stored in the plurality of queues, a command, to which a predetermined channel is assigned, to a command execution unit, in preference to commands assigned to other channels.

11. A storage medium according to claim 10, wherein the function of assigning dynamically changes the address range which indicates the destination of writing the result of executing the command and which should be assigned to each of a plurality of channels, such that the rate of the number of commands stored in a given queue, of a plurality of queues, to that stored in another queue is lower than a predetermined rate.

* * * * *